Dec. 29, 1936.　　　P. G. SWARS　　　2,066,190
APPARATUS FOR HEATING WATER
Original Filed Jan. 4, 1933　　2 Sheets-Sheet 2
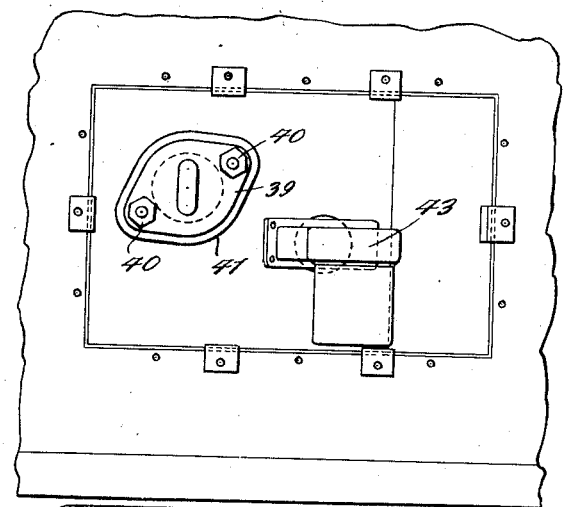
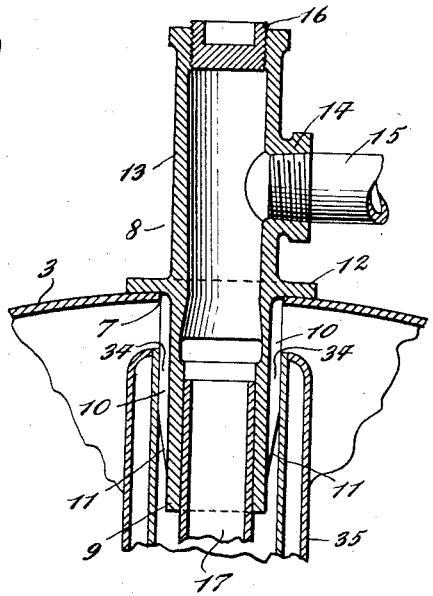
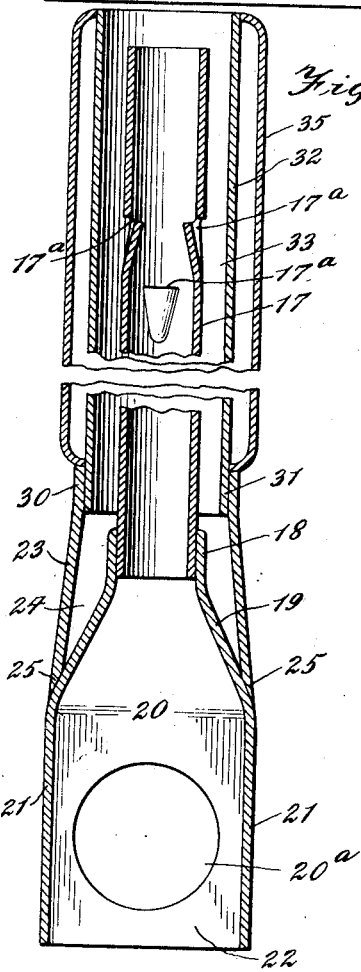
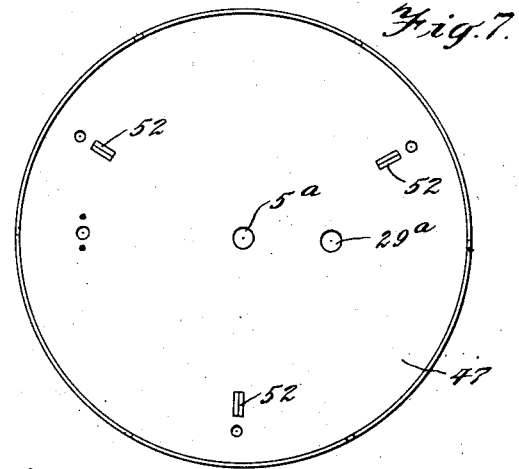
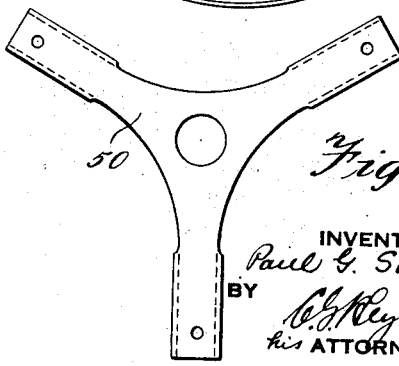
INVENTOR-
Paul G. Swars
BY
his ATTORNEY- Patented Dec. 29, 1936

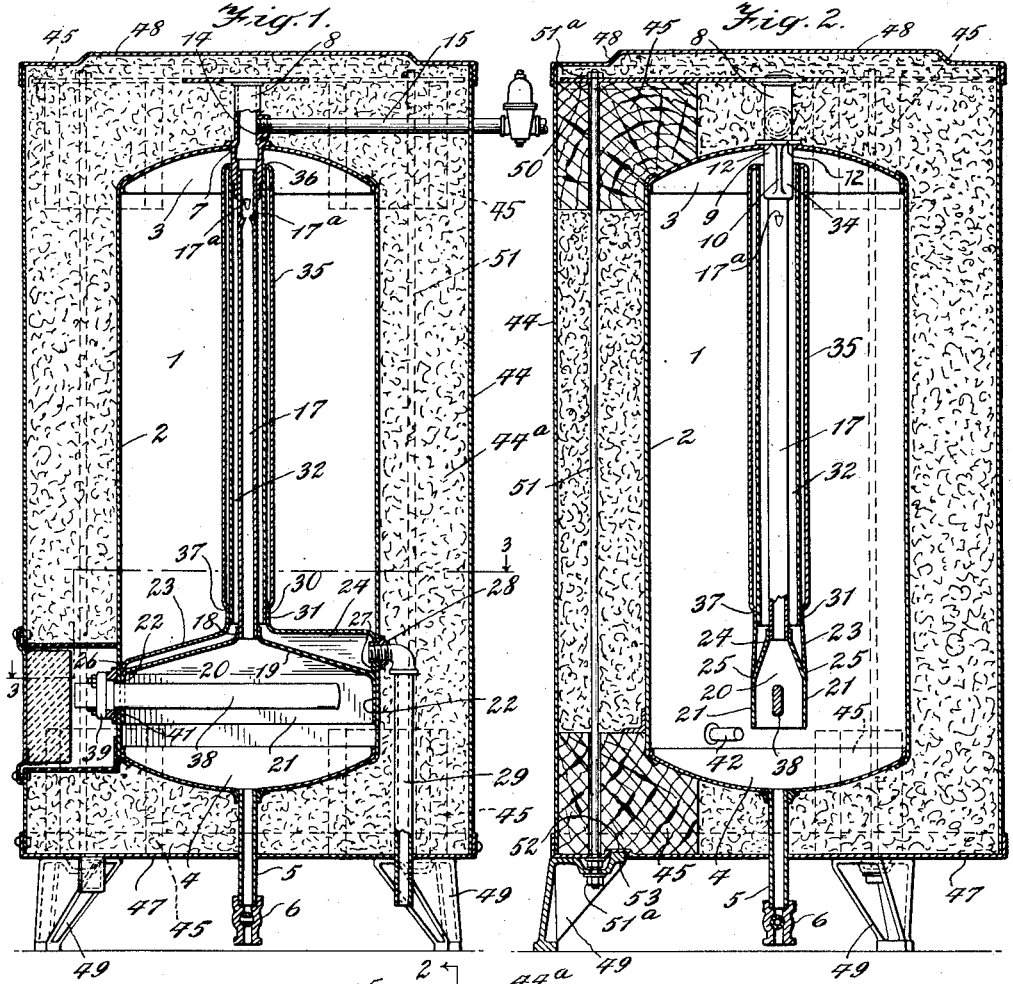
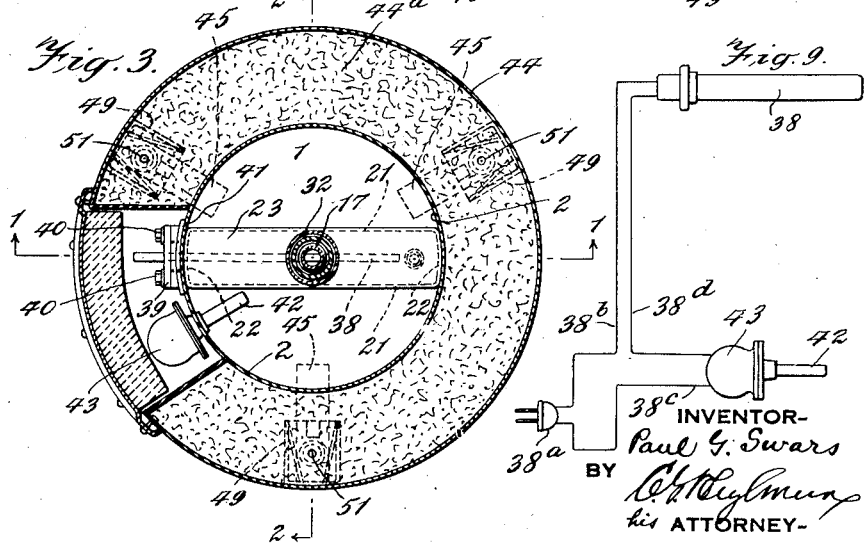

2,066,190

UNITED STATES PATENT OFFICE 2,066,190

APPARATUS FOR HEATING WATER

Paul G. Swars, Larchmont, N. Y.

Application January 4, 1933, Serial No. 650,106
Renewed October 11, 1935

25 Claims. (Cl. 219—38)

My invention relates to new and useful improvements in apparatus for heating water, and while the invention is capable of various applications and uses, it particularly contemplates and is hereinafter described as being practiced in connection with and embodied in a heating apparatus of the so-called storage type adapted to heat water within a tank or other receptacle and maintain therein a supply of such heated water for withdrawal therefrom for use as desired.

The primary object of the invention, among others which will be evident from the following description, is to provide an apparatus for the purpose mentioned, which will within a given determined capacity efficiently provide and maintain a supply of heated water for use when desired, and which will function to replenish the supply of heated water with efficiency and promptness whenever the withdrawal of water from the supply reduces the temperature thereof below a determined degree.

The invention consists in the improved apparatus for carrying the same into effect, to be more fully described hereinafter, and the novelty of which will be particularly pointed out and distinctly claimed.

In the accompanying drawings to be taken as a part of this specification, I have shown a preferred embodiment of an apparatus embodying my invention.

Figure 1 is a vertical, central section of a storage tank heater embodying my invention, taken on the line 1—1 of Fig. 3;

Fig. 2 is a vertical, central section on the line 2—2 of Fig. 3;

Fig. 3 is a transverse section on the line 3—3 of Fig. 1;

Fig. 4 is an enlarged, detail, sectional view of an inlet connection and associated parts shown in Fig. 1;

Fig. 5 is an enlarged, detail, longitudinal, sectional view of a heating chamber, modulating column, and flow provisions, the section being on the same line as in Fig. 2;

Fig. 6 is a detail elevation showing in end view an electrical heating element and a thermostatic switch control instrument for the electrical supply circuit to said element;

Fig. 7 is a plan view of the bottom or head for the casing of the heater;

Fig. 8 is a plan view of an alinement spider employed in assemblage of various elements of the structure, and Fig. 9 is a diagrammatic view of an electric circuit for supplying current to a heating element, and including a thermostatic controlling switch.

Referring to the drawings by characters of reference—1 designates a vertically disposed, metallic tank preferably cylindrical in form and including an intermediate, cylindrical body shell 2, the upper and lower ends of which are closed, respectively, by top and bottom heads 3, 4 secured to the shell by welding, riveting, or other suitable means, so as to provide a liquid-proof joint. The lower head 4 is provided with a drain or blow-off connection 5 controlled by any suitable valve 6 and by means of which the tank may be drained of its contents when desired.

The upper head 3 is provided with a central opening 7 to receive a supply fitting 8, which comprises a tubular member having a lower part 9 projecting through said opening 7 into the tank and provided with external, longitudinal ribs 10 spaced from each other around said part, and preferably having the lower portions chamfered, as at 11, toward the lower ends thereof. The fitting 8 is provided with an intermediate annular flange 12 which overlies the outer surface of the head 3 around the opening 7 and is secured thereto by any suitable means, such, for example, as welding, in order to form a fluid-tight joint between the fitting and the head. The upper portion 13 of the fitting which is external to the tank, is tubular and in axial alinement with the part 9 and is provided with an inlet nipple 14 to which is connected a supply pipe 15 through which water to be heated flows into the fitting and down through the part 9 into the tank. The upper end of the fitting may be closed and sealed by a closure plug 16 threaded into the bore of the fitting.

In the lower end of the part 9 is fitted and sealed the upper end of a column or pipe 17, the lower end of which is sealed in a nipple 18 on the upper wall 19 of a heating chamber 20, which comprises said upper wall 19 and side walls 21 connected by end walls 22, the bottom of the chamber 20 being open, as shown in Figs. 2 and 5, so that the interior of the chamber communicates with the lower portion of the water space in the tank. It will be noted that the chamber 20 is substantially oblong in horizontal section, and is of less transverse width than the diameter of the tank, so that water fed into the chamber through column 17 may pass through the open bottom of the chamber into the bottom of the tank and rise around the heating chamber into the upper portion of the tank above the heating chamber. The end walls 22 of the chamber preferably engage the inner face of the shell 2 and are welded thereto so that the chamber is rigidly supported in place at a point above the bottom of the tank and preferably below the transverse center thereof.

Arranged over the top of the heating chamber 20 above described, is a hood member 23 spaced therefrom to form a hot water receiving chamber 24, the said hood member conforming in shape substantially to the contour of the heating chamber and having its longitudinal side edges sealed by welding, as at 25, to the side walls of the heating chamber, and having one of its end portions welded to the tank shell and one end of the heating chamber, as at 26, the other end of the hood being somewhat elevated, as shown in Fig. 1, and provided with an end wall 27 welded to the adjacent end of the heating chamber and to the tank wall and provided with an aperture receiving a fitting 28 for connection to an outlet pipe 29, through which heated water may be withdrawn from the tank, as will be hereinafter described. It will be understood that the hood 23 is sealed at all points to the heating chamber so as to be closed against communication with the interior of the tank, except as will be hereinafter described.

The hood is provided with a central, upwardly directed neck portion 30, in which is sleeved and welded, as at 31, the lower end of a downflow, tubular column 32, preferably surrounding and concentric with the pipe 17 and spaced therefrom so as to provide an annular free flow passage 33 around the column 17. The column 32 extends upwardly around the pipe 17, and at its upper end receives the lower end of part 9, the upper end of the column tightly engaging the outer face of the ribs 19 so as to form a plurality of flow passages 34 between said column 32 and the part 9. Surrounding the column 32 and spaced therefrom is a jacket 35 sealed at its upper and lower ends, as at 36 and 37, to the column so as to form an air jacket around the column for heat insulating purposes to produce an effect hereinafter described.

The upper end portion of the pipe 17 is provided with one or more flow openings 17a for metering the water flow for a purpose to be hereinafter described, these openings being preferably formed by punching in the wall of the pipe in the manner shown in Fig. 5 of the drawings.

Projecting into the heating chamber 20, preferably above the open bottom thereof and extending longitudinally thereof, is a horizontally disposed electric heating element 38 insertable through an opening 38a (Fig. 5) in one of the end walls of said heating chamber and secured removably in place by a suitable mounting 39 bolted, as at 40, to a fitting 41 secured by welding to the external surface of the shell 2. Projecting into the liquid containing space at the lower portion of the tank and preferably adjacent the lower edge of the heating chamber, is the heat responsive element 42 of a thermostatic switch 43 mounted on the shell of the tank external thereof, and for convenience, preferably adjacent the mounting for the heating element. The switch 43 is connected in a circuit (Fig. 9), for supplying and controlling electric current to the heating element 38, and operates to close and open the circuit under conditions and for a purpose to be presently described. It will be noted that the thermostatically responsive element 42 is located at a point where it will respond to the temperature of the water in the tank adjacent the bottom or open end of the heating chamber 20 and above the bottom head of the tank.

The tank is preferably enclosed within an outer cylindrical sheet metal shell 44 spaced from the tank a suitable distance, and containing supporting blocks 45 of wood or other suitable material at the upper and lower portions thereof which engage the heads and sides of the tank 2 to support the same centrally within the shell 44. The lower end 46 of the shell 44 is closed by a head 47 spaced from the bottom of the tank, and the upper end of the shell is closed by a head 48 spaced from the upper end of the tank, the lower head preferably resting upon suitable legs 49. Overlying the upper, wooden blocks is a spider member 50 between the head 48 and the tank, as shown in Fig. 8, and the legs 49, head 47, and upper and lower blocks 45 are secured in assembled relation by means of vertical tie-rods 51 passing vertically through the legs, blocks and spider and secured in place by clamping nuts 51a on the upper and lower ends of said rods. The assemblage just described rigidly secures the parts in relation to properly support and center the tank within the outer shell 44. The lower head is provided with apertures 5a and 29a for passage of the pipes 5 and 29, respectively, and is also formed with recesses 52 to receive lugs 53 on the legs to prevent turning of the legs on the tie-rods when the assemblage is complete. The space between the shell 44 and tank 1 is packed with a suitable heat insulating material 44a, such as rock-wool, to prevent radiation from the tank, so that the hot water therein will retain its heat over long periods.

Assuming that the heater is constructed as above described, that the water inlet pipe 15 is connected to any suitable source of cold water supply to fill the tank, and the outlet 29 is connected to a piping system leading to any point of service, and that the thermostatic switch 43 is set to open the heater circuit at approximately 175° F. and close the circuit at 165° F., the operation of the system is as follows: The thermostatic switch will be closed, inasmuch as the bulb or heat responsive element 42 subjected to the cold water will be at a temperature below 165° F., and current will be supplied to the element to cause the same to supply heat. The heating element being energized, the water in the heating chamber 20 and in direct contact with the heating element, is heated and rises through the pipe 17, emerging therefrom through the metering ports 17a and passing up through the passages 34 into the tank and outside the column to mix with the water at the top of the tank, thus forming a stratum of heated water over the cooler water in the lower portion of the tank. This operation continues until the tank is substantially full of hot water, and after a period of time the stratum of hot water delivered at the top portion of the tank descends until the water at the base of the tank and adjacent the thermostatic element 42, increases in temperature to approximately 175° F., whereupon the thermostatic element 42 responds to the temperature of the water to open the switch 43 and cut off the current to the heating element 38. The water in the tank will then have a temperature of approximately 190° F. to 195° F. at the top of the tank, and at the bottom of the tank the water temperature will be approximately 170° F. to 175° F., so that it will be seen that the tank will be full of heated water at the time the circuit is broken. Due to the effective heat insulation of the tank, the body of water therein will retain its heat over a long period, but should no water be withdrawn over a considerable period permitting the water to cool below 165° F. at the base of the tank adjacent the thermostat, the thermostat will respond to close the switch, thereby energizing the heating element 38 long enough to bring the water temperature at the base of the tank back to 175° F., whereupon the heater circuit will be discontinued. During periods when the water is not withdrawn, the element 38 will be operated to maintain the water at a desired temperature for satisfactory service supply when desired.

When a service outlet connected to the outlet pipe 29 is opened, hot water or water at the highest temperature, i. e., approximately 190° F. to 195° F. will be withdrawn from the top of the tank, this water flowing into the column 31 through the passages 34 and descending to the modulating chamber 24, whence it emerges through the outlet pipe 29 with its temperature reduced, due to the heat transfer to the incoming cold water and the temperature reducing effect produced by the modulating chamber. The withdrawal of warm water causes the previously heated and stored body of water to be replaced, automatically establishing inflow of water from the pipe 15 downward through the pipe 17, which water will be at normal supply main temperature—say, 50° F.—and flows down into the heating chamber or hood 20, so that some of the heat of the outflowing hot water will be taken up by the inflowing relatively cold water, the latter having its temperature raised by the heat transfer so that it reaches, say, approximately 100°–125° F. before settling in the bottom of the tank, assuming that the mean temperature of the stored water is at approximately 185° F. adjacent the bottom of the tank and the inlet cold water from the supply main is at approximately 50° F. This cool inlet water entering the chamber 20 and the base of the tank, will promptly reduce the temperature of the water in the bottom of the tank to a temperature low enough to cause the thermostat to close the heater circuit, and the heater will heat this inlet water during the withdrawal of the upper stratum of heated water from the top of the tank, thus serving to increase the service capacity of the heater by continuously heating the incoming cold water so that the heater will deliver to the service line a greater amount of water satisfactorily heated than the actual volumetric capacity of the tank—for example, a thirty gallon tank containing water at approximately 185° F. to 195° F. will continuously deliver water at a reduced or modulated temperature until thirty gallons are withdrawn, and will then continue to deliver a further supply at approximately 130° F. up to approximately a total supply of over fifty gallons with a final minimum delivery temperature of 100° F.

The heat transfer between the hot outgoing water and the cold incoming water not only serves to modulate the temperature of the outgoing water but to preheat the incoming water sufficiently to result in a rapid reheating of the contents of the tank and a reduction of the amount of current consumed. In a thirty gallon tank the heating element may be and preferably is of the refractory immersion type, and capable of delivering sufficient heat to the water at an initial operation when first supplying the tank with water, to heat the water to a temperature of approximately 190° F. to 195° F. at the top of the tank and to 185° F. adjacent the thermostatic bulb in approximately six hours.

It is to be noted that in the above operation when water is being withdrawn from the tank, that there is a slight mixture of the cold entering water with the hot water through the ports 17ᵃ, thus tending to modulate the temperature of the outgoing water in this way in addition to the heat transfer between the hot and cold streams of water separated by the wall of the pipe 17. The apertures 17ᵃ are also made of such size so as to meter or cut down the flow of hot water therethrough during the heating period, and thereby prevent active circulation of the water in the tank, and to cause the hot water to stratify in the top of the tank and gradually descend toward the bottom thereof, as distinguished from an active or rapid circulation. These orifices are slightly in excess of the actual heater capacity, and allowing a minimum of circulation to prevent excessive top tank temperature. In addition to the functions just described, the apertures 17ᵃ also serve as anti-siphoning vents. Should the cold water intake become open to the air, for example, upon failure of the cold water supply, hot water cannot be drawn out of the tank below the level of these apertures, thus preventing the burning out of the electrical element. The combined area of these apertures may be approximately that of a $\frac{5}{16}''$ diameter circle, which will be found to produce the desired moment of retarded circulation described when used with a 1500–1750 watt heating element, which is an accepted capacity at present for use with a thirty to fifty gallon tank.

It is also important to note that the location of the thermostatic bulb at a point beneath the heating element 38 and adjacent the lower open end of the heating chamber 20, assures that the heated water which determines cessation of the heating current will descend substantially to the bottom of the tank, thus assuring that the tank will be substantially full of water heated to a proper degree for service before the current to the heating element is terminated by the thermostat.

It will be understood that while I have described the invention as operating within certain temperature limits, that these may be varied to suit conditions without departing from my invention.

During recharging while water is being withdrawn, the cold water flowing down the pipe 17 collects in the bottom of the tank and then rises around the heating chamber 20 and in the tank. As the upper hot portion is being drawn off, the cooler water follows it, gradually lowering the temperature of the tank contents, so that when all of the previously heated and stored supply is drawn off, the contents of the top of the tank will be at a temperature of approximately 130°–150° F. and at the bottom of the tank about 70°–100° F. At this point in withdrawal in a tank of thirty gallon capacity there will be a quantity of 130°–150° F. water at the top of the tank available for service, that is, at the end of one complete withdrawal of the entire thirty gallon charge of water. It will therefore be seen that one complete charge of the thirty gallon tank heated to a temperature ranging from 190° F. to 195° F. at the top of the tank, to 175°–185° F. at the bottom of the tank, will render available for service not only the thirty gallons at the range of temperatures mentioned, but also a further substantial supply ranging from 130°–150° F. at the top of the tank to a lower temperature—say, 70°–100° F. at the bottom of the tank, so that one charge plus the recharging occurring during withdrawal of the charge affords a much greater supply measured in gallons, and at a suitable temperature than the initial charge.

The initial supply of hot water withdrawn will be at the temperature existing in the outside column 32, but almost instantly the supply withdrawn will be from the water at the top of the tank, but since the outflow is sufficient to create full flow of the inlet water down the central tube 17 and reduce the initial temperature thereof, the cold water will absorb heat from the hot water flowing down the column 32, thereby heating the incoming water and cooling the outgoing water by what I term a modulating effect. In this way the water delivered from the tank will be at approximately 145° F.

The heat insulating jacket 35 serves to insulate the member 32, and thus reduce heat transfer between the water in the space between member 32 and tube 17, and the water in the storage space of the tank during periods of withdrawal when the heated water is flowing down the said space, and cooler or cold inflowing water rises in the tank storage space.

In Fig. 9 is shown a suitable circuit for supplying current to the heating element 38, the same including, for example, a plug 38ᵃ for connection to a suitable wall socket or outlet fixture, one plug terminal being connected by a lead 38ᵇ to the heating element 38, and the other plug terminal being connected by a lead to a contact of the switch 42. The element 38 is connected by a conductor 38ᵈ to the other contact of the switch, the arrangement being such that when the switch contacts are in closed relation, current flows from the source by way of lead 38ᵇ to the element 38, thence by connection 38ᵇ to the switch, and by lead 38ᶜ to the source. It will be understood that the switch 42 may be of any suitable well known form, which embodies provision for closing the circuit at a desired low temperature, and opening the circuit at a desired high temperature.

What I claim and desire to secure by Letters Patent of the United States is:

1. In a storage water heater, a tank, a cold water feed supply conduit extending downward through said tank and delivering cold water to the lower portion of the tank, said conduit having an opening located in the upper portion of the tank, and an electric heating element in said conduit, whereby said conduit delivers cold water to said element to be heated thereby, and will conduct a reverse flow of heated water from the element and through said opening into the upper portion of the tank.

2. In a storage water heater, a tank, a cold water feed supply conduit extending downward through said tank and delivering cold water to the lower portion of the tank, said conduit having an opening located in the upper portion of the tank, an electric heating element in said conduit, whereby said conduit delivers cold water to said element to be heated thereby, and will conduct a reverse flow of heated water from the element and through said opening into the upper portion of the tank, and thermostatic means subject to the water temperature adjacent said element to control a circuit supplying current to said element.

3. In a storage water heater, a tank, a cold water feed supply conduit extending downward through said tank and delivering cold water to the lower portion of the tank, said conduit having an opening located in the upper portion of the tank, and an electric heating element in the lower portion of said conduit, whereby said conduit delivers cold water to said element to be heated thereby, and will conduct a reverse flow of heated water from the element and through said opening into the upper portion of the tank.

4. In a storage water heater, a tank, a cold water feed supply conduit extending downward through said tank and delivering cold water to the lower portion of the tank, said conduit having an opening into the upper portion of the tank, and an electric heating element in the lower portion of said conduit, whereby said conduit delivers cold water to said element to be heated thereby, and will conduct a reverse flow of heated water from the element and through said opening into the upper portion of the tank, said opening being of such flow capacity relative to the heating capacity of the element as to permit flow of the heated water therethrough but prevent active circulation of the water in the tank.

5. In a storage water heater, a tank, an electric heating element in the lower portion of the tank and above the bottom of the tank, a chamber enclosing said element and having communication with the water space in the lower portion of the tank, a cold water supply member located in the water space above said chamber and delivering water into said chamber to be heated by said element, and said member having flow communication with the water space above said chamber, whereby said member will serve to supply the tank with water to be heated, and will conduct a reverse flow of heated water from said chamber to the upper portion of the tank.

6. In a storage water heater, a tank, an electric heating element in the lower portion of the tank and above the bottom of the tank, a chamber enclosing said element and having communication with the water space below the element, a cold water supply member located in the water space above the chamber and delivering cold water into the chamber to be heated by said element, and said member having flow communication with the water space at the upper portion of the tank whereby said member will serve to supply the tank with water to be heated, and will conduct a reverse flow of heated water from said chamber into the upper portion of the tank.

7. In a storage water heater, a tank, an electric heating element in the lower portion of the tank and above the bottom of the tank, a chamber enclosing said element and having communication with the water space below the element, a cold water supply member located in the water space above the chamber and delivering cold water into the chamber to be heated by said element, said member having flow communication with the water space at the upper portion of the tank whereby said member will serve to supply the tank with water to be heated, and will conduct a reverse flow of heated water from said chamber into the upper portion of the tank, and means for delivering heated water from the upper portion of the tank.

8. In a storage water heater, a tank, an electric heating element in the lower portion of the tank and above the bottom of the tank, a chamber enclosing said element and having communication with the water space below the element, a cold water supply member located in the water space above the chamber and delivering cold water into the chamber to be heated by said element, said member having flow communication with the water space at the upper portion of the tank whereby said member will serve to supply the tank with water to be heated and will conduct a reverse flow of heated water from said chamber into the upper portion of the tank, and means for delivering heated water from the upper portion of the tank, said supply member and said means being in heat transfer relation.

9. In a storage water heater, a tank, an electric heating element in the lower portion of the tank and above the bottom of the tank, a chamber enclosing said element and having communication with the water space below the element, a cold water supply member located in the water space above the chamber and delivering cold water into the chamber to be heated by said element, said member having flow communication with the water space at the upper portion of the tank whereby said member will serve to supply the tank with water to be heated, and will conduct a reverse flow of heated water from said chamber into the upper portion of the tank, and said flow communication being of such flow capacity relative to the heating capacity of the element as to permit flow of the heated water therethrough but prevent active circulation of the water in the tank.

10. In a storage water heater, a tank, an electric heating element in the lower portion of the tank and above the bottom of the tank, a chamber enclosing said element and having communication with the water space below the element, a cold water supply member located in the water space above the chamber and delivering cold water into the chamber to be heated by said element, said member having flow communication with the water space at the upper portion of the tank whereby said member will serve to supply the tank with water to be heated, and will conduct a reverse flow of heated water from said chamber into the upper portion of the tank, and thermostatic control means subject to water temperature beneath said element for controlling the on and off periods of said element.

11. In a storage water heater, a tank, an electric heating element in the lower portion of the tank, a heating chamber enclosing said element and having an open bottom portion communicating with the water space beneath the element, a cold water supply conduit in the tank and opening into said chamber to deliver cold water thereto, a hot water delivery chamber above said heating chamber, a hot water conduit delivering into said delivery chamber, and having a hot water inlet located in the upper portion of the tank, said conduits being arranged in heat transfer relation to each other.

12. In a storage water heater, a tank, an electric heating element in the lower portion of the tank, a heating chamber enclosing said element and having an open bottom portion communicating with the water space beneath the element, a cold water supply conduit in the tank and opening into said chamber to deliver cold water thereto, a hot water delivery chamber above said heating chamber, a hot water conduit delivering into said delivery chamber, and having a hot water inlet located in the upper portion of the tank, said conduits being arranged in heat transfer relation to each other, said conduits being in communication with each other.

13. In a storage water heater, a tank, an electric heating element in the lower portion of the tank, a heating chamber enclosing said element and having an open bottom portion communicating with the water space beneath the element, a cold water supply conduit in the tank and opening into said chamber to deliver cold water thereto, a hot water delivery chamber above said heating chamber, a hot water conduit delivering into said delivery chamber, and having a hot water inlet located in the upper portion of the tank, said conduits being arranged in heat transfer relation to each other, and a restricted passage providing communication from one conduit to the other conduit.

14. In a storage water heater, a tank, an electric heating element in the lower portion of the tank, a heating chamber enclosing said element and having an open bottom portion communicating with the water space beneath the element, a cold water supply conduit in the tank and opening into said chamber to deliver cold water thereto, a hot water delivery chamber above said heating chamber, a hot water conduit delivering into said delivery chamber, and having a hot water inlet located in the upper portion of the tank, said conduits being arranged in heat transfer relation to each other, a circuit supplying current to said element, and a thermostatic switch responsive to temperature adjacent said element and controlling said circuit.

15. In a storage water heater, a tank, an electric heating element in the lower portion of the tank, a heating chamber enclosing said element and having an open bottom communicating with the water space below the element, a cold water supply conduit extending downwardly through the tank and delivering cold water into said heating chamber, a hot water delivery chamber adjacent the heating chamber, a hot water conduit surrounding the said cold water supply conduit in heat exchange relation thereto, and having an inlet for heated water in the upper portion of the tank and an outlet into said delivery chamber, and an outlet connection from said chamber.

16. In a storage water heater, a tank, an electric heating element in the lower portion of the tank, a heating chamber enclosing said element and having an open bottom communicating with the water space below the element, a cold water supply conduit extending downwardly through the tank and delivering cold water into said heating chamber, a hot water delivery chamber adjacent the heating chamber, a hot water conduit surrounding the said cold water supply conduit in heat exchange relation thereto, and having an inlet for heated water in the upper portion of the tank and an outlet into said delivery chamber, and an outlet connection from said chamber, said inlet conduit having a port communicating with the interior of the hot water conduit.

17. In a storage water heater, a tank, an electric heating element in the lower portion of the tank, a heating chamber enclosing said element and having an open bottom communicating with the water space below the element, a cold water supply conduit extending downwardly through the tank and delivering cold water into said heating chamber, a hot water delivery chamber adjacent the heating chamber, a hot water conduit surrounding the said cold water supply conduit in heat exchange relation thereto, and having an inlet for heated water in the upper portion of the tank and an outlet into said delivery chamber, and an outlet connection from said chamber, said inlet conduit having a port communicating with the interior of the hot water conduit, the said port communication being of flow capacity in excess of the flow generating capacity of the heating element but such as to retard circulation within the tank.

18. In a storage tank water heater, a tank, an electric heating element in the lower portion of the tank and above the bottom of the tank, a heating chamber enclosing said element and having communication with the water space below the element, a cold water supply conduit located in the space above the heating chamber and having its upper end connected communicatively to a water supply from outside of the tank, and its lower end connected communicatively to said heating chamber to deliver water thereto to be heated by said heating element, said conduit having communication with the water space at the upper portion of the tank, said communication providing for flow of heated water from said conduit into the tank when the said element acts to heat the water and cause it to flow upward through said conduit, and means for withdrawing heated water from the upper portion of the tank.

19. In a storage water heater, a tank, an electric heating element in the lower portion of the tank, a heating chamber enclosing said element and having flow communication with the water space below the element, a cold water supply conduit extending downwardly through the tank and delivering cold water into said heating chamber, a hot water delivery conduit surrounding said cold water supply conduit in heat exchange relation thereto, and having a hot water inlet located in the upper portion of the tank, and a hot water outlet connection from the lower portion of said hot water delivery conduit to the exterior of the tank.

20. In a storage water heater, a tank, a cold water feed supply conduit extending through said tank and delivering cold water to a compartment in the tank, said conduit also having an opening into the tank, and means for heating the water in said compartment, the conduit and compartment being arranged so that the conduit delivers cold water to the compartment and will conduct a reverse flow of heated water from the compartment and through the opening into the tank.

21. In a storage water heater, a tank, a cold water feed supply conduit extending through said tank and delivering cold water to a compartment in the tank, said conduit also having an opening into the tank, means for heating the water in said compartment, the conduit and compartment being arranged so that the conduit delivers cold water to the compartment and will conduct a reverse flow of heated water from the compartment and through the opening into the tank, and thermostatic means subject to the temperature of the water in the tank to control the operation of said heating means.

22. In a storage water heater, a tank, concentric tubes extending from the top to the bottom of said tank, the tubes being spaced apart, a cold water connection to the top of one of said tubes, means for heating the water in said tube, and a hot water outlet from near the top of said tube into said tank.

23. In a storage water heater, a tank, concentric tubes extending from the top to the bottom of said tank, the tubes being spaced apart, a cold water connection to the top of one of said tubes means for heating the water in said tube, and a hot water outlet from near the top of said tube into said tank, and thermostatic means to control said heating means, the thermostatic means being mounted in the tank in position to be unaffected directly by the heating means.

24. In a storage water heater, a storage tank, a chamber at the bottom thereof, heating means in said chamber, a pair of concentric tubes extending vertically through said storage tank from said chamber, a cold water inlet connection to the top of one of said tubes, and a hot water outlet connection to the bottom of the other of said tubes.

25. In a storage water heater, a storage tank, a chamber at the bottom thereof, heating means in said chamber, a pair of concentric tubes extending vertically through said storage tank from said chamber, a cold water inlet connection to the top of one of said tubes, a hot water outlet connection to the bottom of the other of said tubes, and thermostatic means controlling the operation of said heating means.

PAUL G. SWARS.